Oct. 26, 1926.                                        1,604,322
W. W. SMITH ET AL
MEANS TO PREVENT VEHICLES FROM SKIDDING
Filed May 20, 1926        3 Sheets-Sheet 3
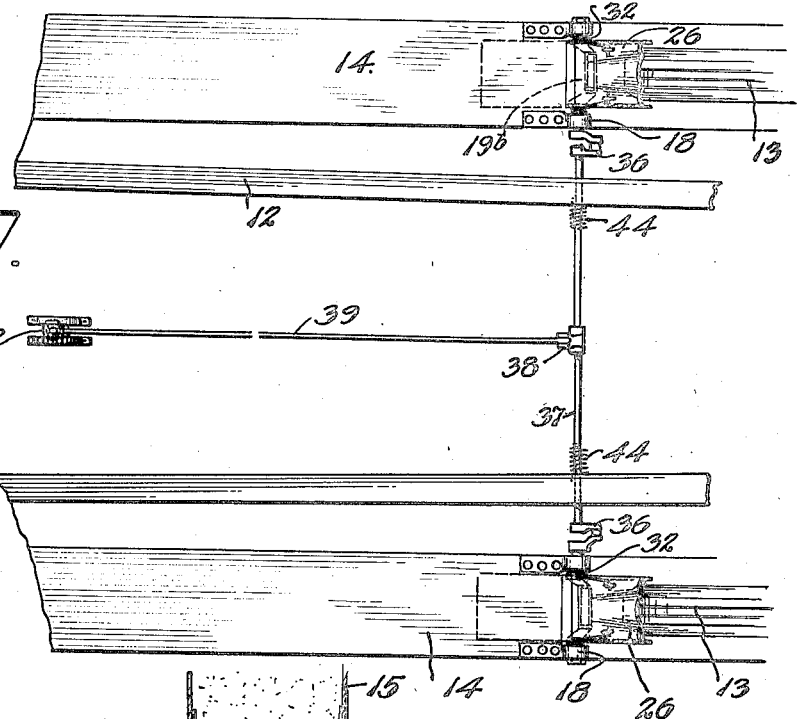
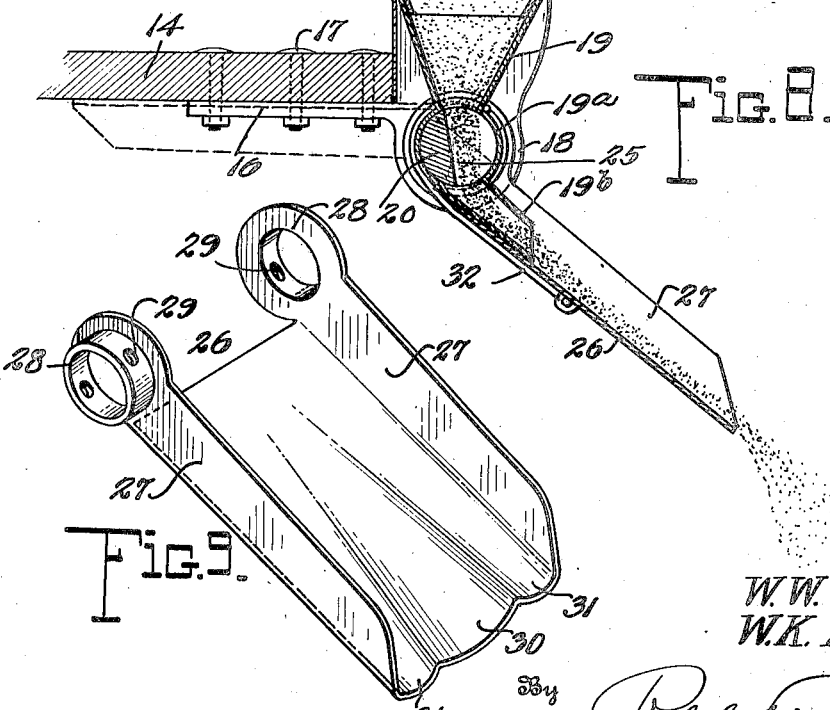
Inventor
W. W. Smith
W. K. Porter Patented Oct. 26, 1926.

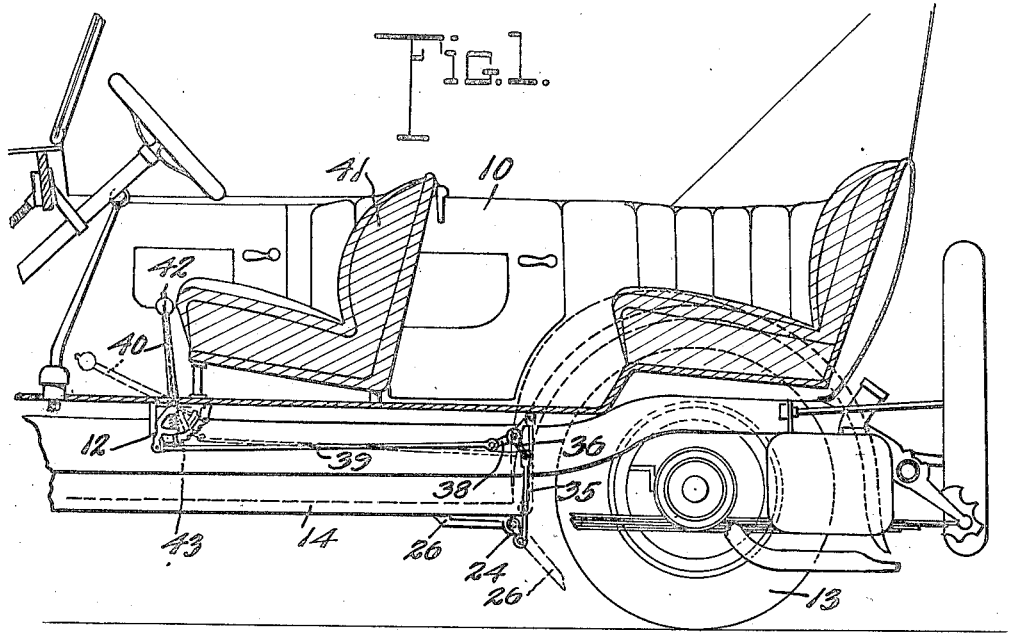
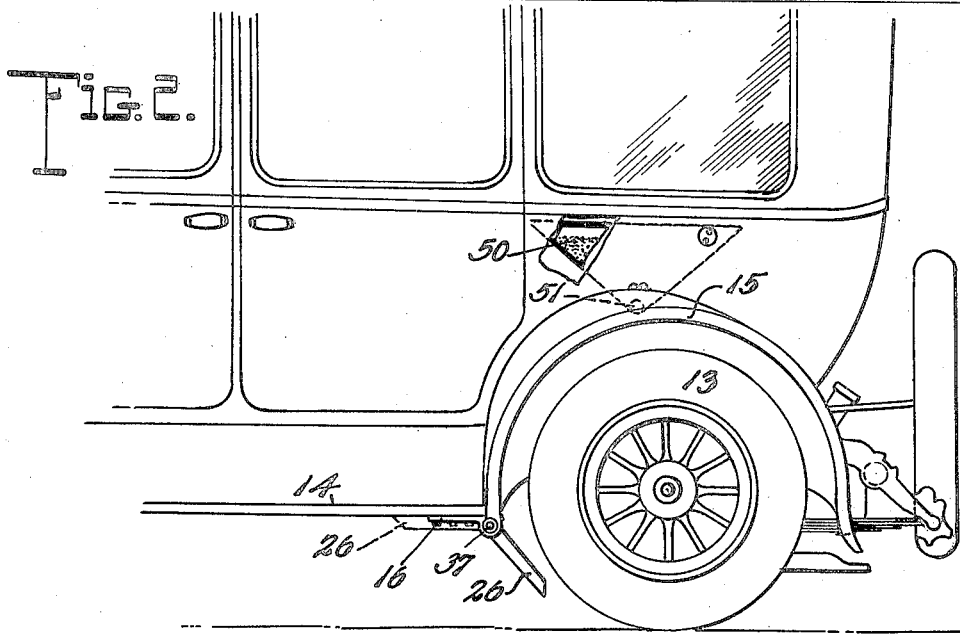

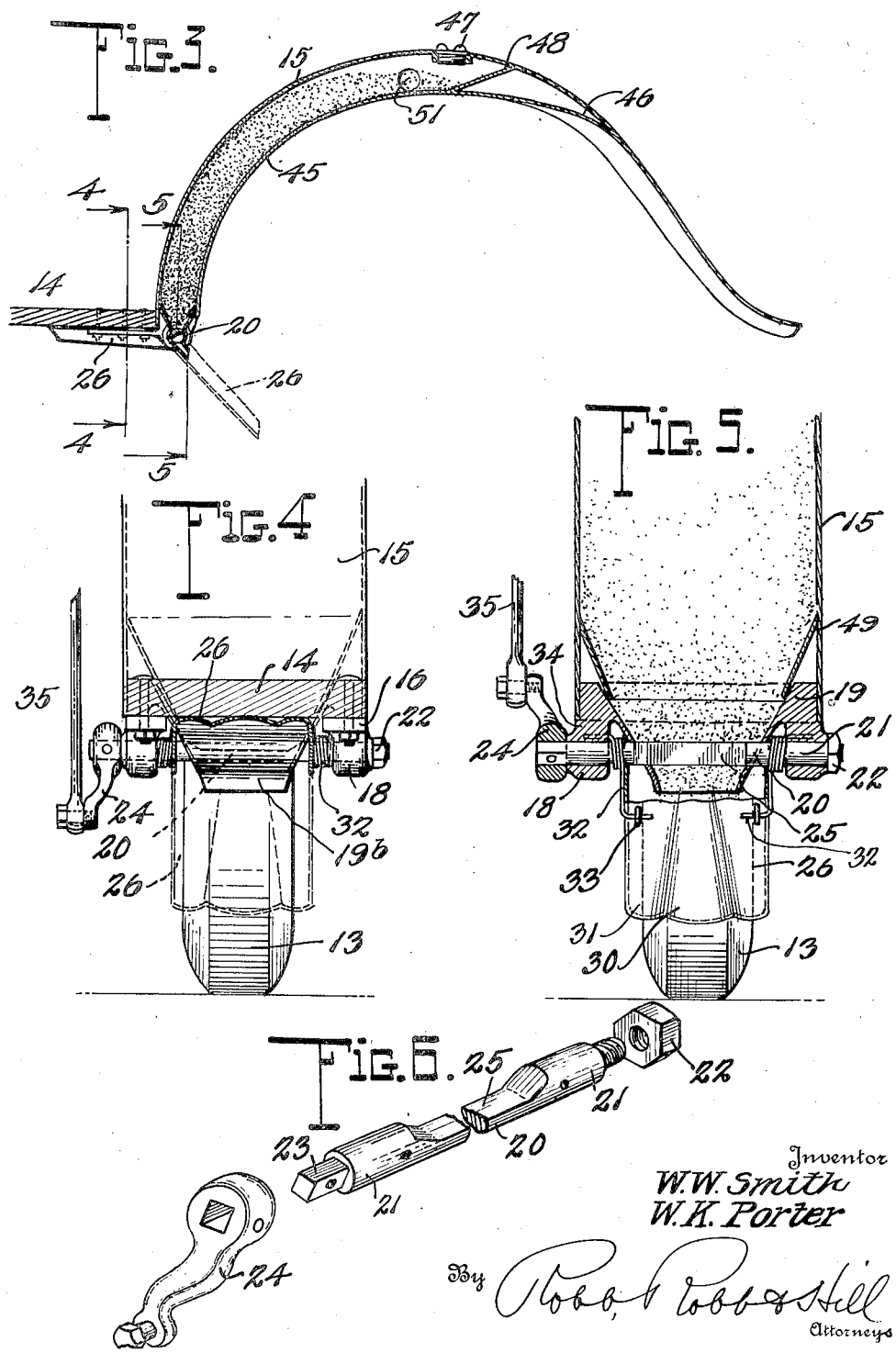

1,604,322

UNITED STATES PATENT OFFICE.

WILLIAM W. SMITH AND WILLIAM K. PORTER, OF PITTSBURGH, PENNSYLVANIA.

MEANS TO PREVENT VEHICLES FROM SKIDDING.

Application filed May 20, 1926. Serial No. 110,405.

This invention relates to means to prevent vehicles from skidding, and particularly to a construction adapted for application to a motor vehicle to deliver anti-slipping material in the path of the traction wheels thereof.

In previous constructions of this character the material delivered has been associated with and more or less controlled by operative members of the vehicle, such as the brakes, clutch or exhaust, which frequently prevents the application of the anti-skid material when such members are not operated and does not leave the driver free to effect a continuous feed of sand independently of his control of the other driving members of the vehicle. In such prior devices the amount of gritty material fed is limited so that a continuous feed regulated in capacity has not been effected. If the valve be left open to its fullest extent the feed hopper will be quickly exhausted and it is frequently desirable, such as when driving upon slippery hills, to maintain a limited feed directly beneath the tread of the wheel, and this in the present invention is effected by an adjustment of the valve capacity.

Further, the former devices merely delivered the material broadcast or in the general direction of the wheel, whereas it is particularly desirable to positively direct the material beneath the wheel and immediately at each side thereof so as to prevent the initial skidding or slipping which is difficult to control.

In earlier devices of this character the delivery trough and its controlling means have been disposed upon the vehicle in a more or less prominent position so as to detract from its appearance and leave these parts liable to injury in contact with obstacles particularly when not in use, and this invention therefore seeks to so mount the cut-off valve and its trough upon the running board in direct contact with a hopper formed in the rear fender that when not in use the trough may be folded beneath the running board in a concealed and protected position.

The invention therefore has for an object to provide a construction embodying a hopper and distributing trough with an intermediate cut off valve having operating connections by which it may be adjusted to different open positions to effect a limited continuous feed and to be automatically closed when the operating connection is released.

Another object of the invention is to provide an improved mounting for the valve and trough at the lower portion of the hopper disposed to project the trough when the valve is opened and to move the same into a concealed and protected position when the valve is closed.

A further object of the invention is to provide an improved structure of cylindrical cut-off valve having the delivery trough secured thereto and said valve mounted in a bearing plate adapted for application to the running board of a vehicle in a position to communicate with a hollow fender forming a feed hopper.

A further object is to present a new form of delivery trough provided with channels by which the material may be positively directed in its passage toward a traction wheel of a vehicle.

Other and further objects and advantages of the invention will be hereinafter set forth and the novel features thereof defined by the appended claims.

In the accompanying drawings:

Figure 1 is a longitudinal section through a vehicle with the invention applied thereto;

Figure 2 is a side elevation showing the invention applied to a closed vehicle;

Figure 3 is a vertical longitudinal section through the hopper and delivery mechanism;

Figure 4 is a section on the line 4—4 of Figure 3;

Figure 5 is a similar view on the line 5—5 of Figure 3;

Figure 6 is a detail perspective of the cut-off valve;

Figure 7 is a bottom plan;
Figure 8 is a detail vertical section of the valve and trough; and
Figure 9 is a detail perspective of the trough.

Like reference characters designate corresponding parts throughout the several figures of the drawing.

The invention is adapted for application to any type or character of motor vehicles and is herein shown in Figure 1 as applied to an open or touring car 10, and in Figure 2 to a closed car 11 the frame or chassis 12 of either form of car carrying at the rear the traction wheels 13, and it is important to deliver the gritty material for anti-skidding and non-slipping purposes directly to the tread of these wheels. The character of material to be used may be varied but the use of ground cinders is found desirable as it involves less weight and throws more easily than sand which is inclined to pack if damp and involves such weight as to render its use in connection with a hopper within a fender impracticable. For the purposes stated the distributing device is preferably mounted upon the running board 14 at each side of the vehicle and at the rear thereof so as to communicate with the fenders 15 above the rear wheels.

For the purposes of such mounting we provide a plate 16 adapted to be secured beneath the running board 14, for instance by bolts 17 and provided at one end with bearing lugs 18 and supporting an upwardly extending receiving neck 19 adapted for connection to the hopper. This neck communicates with the valve casing 19ª from which a discharge spout 19ᵇ extends diagonally downward. The cylindrical cut-off valve 20 is pivotally mounted in the lugs 18 at its opposite ends 21 and is secured against lateral displacement by a nut 22 threaded thereon at one end. The opposite end of the valve is provided with an angular portion 23 to which the crank 24 is secured, while intermediate of these end portions the body of the valve is cut away at 25 to provide a delivery passage therethrough.

The valve has secured thereto the trough 26 which as shown in Figure 9 is provided with side walls 27 having at their upper ends collars 28 to fit over the cylindrical body of the valve and be secured thereto by suitable means passing through the apertures 29 in the collars and valve. For the purpose of securing a definite direction in the delivery of material, the floor or bottom of the trough is provided with channels, such as a central channel 30 disposed in alignment with the tread of a traction wheel and side channels 31 adapted to deliver at opposite sides of such a wheel and immediately adjacent thereto. These channels are of the greatest depth at the delivery end of the trough and are merged into the body thereof at its receiving end. For the purpose of automatically restoring the trough to its concealed and protected position beneath the running board as shown by dotted lines in Figure 8 and at the same time closing the valve, tension springs 32 are provided which surround the cylindrical valve and have an end 33 beneath the trough and an opposite end 34 connected with the lug.

For the purpose of positively actuating the valve and trough and retaining the former in partially open position, various connections may be provided but a preferable form is shown in Figure 1 wherein the crank 24 is connected by a link 35 with a crank arm 36 upon the end of a cross shaft 37 which is pivotally mounted in the frame 12 of the vehicle, these parts being duplicated at opposite sides. This shaft is further provided with a lever arm 38 from which a connecting rod 39 extends to a control lever 40 mounted adjacent the side 41 for the operator of the vehicle. This lever is here shown as provided with a latch rod 42 cooperating with a sector 43 by which it may be held in any desired position such as when opening the valve to only a limited extent for continuous delivery.

With the parts in the position shown by full lines in Figure 1, the valve is closed and the trough nested beneath the running board 14 while if the latter be moved forward to the dotted line position the valve is opened and the trough projected into position to deliver directly beneath the tread of the wheel. To insure a restoring of the parts and relieve necessary tension in the operation of the lever, springs 44 may be secured to the cross rod 37 and to the frame 12 so as to restore the valve to closed position.

An improved construction of the feed hopper is shown in Figure 3 and this is effected by welding to the under side of the fender 15 a closure plate 45 extending parallel to the fender and merging into the line thereof at its rear 46. The fender is provided with a raised crown, Fig. 2, and a filling opening 47 having a suitable closure and the rear wall 48 is provided for the hopper adjacent this opening. At the delivery or lower end of the hopper a funnel portion 49 is secured thereto and extends into the feed portion 19 carried by the securing plate. As the capacity of a hopper formed in the fender is necessarily limited it is desirable to provide a further reservoir for material which as shown at 50 in Figure 2 may be disposed within the vehicle between its outer wall and the finishing upholstery and communicates at 51 with the hopper.

The operation of the invention will be apparent from the foregoing description from which it will be seen that the delivery capacity of the cut-off valve may be adjusted by the operation of the control lever to different degrees and this also varies the inclination of the trough relative to the wheel. When the valve is fully opened the trough projects the material directly rearwardly beneath the tread of the wheel while if it be partially opened for continuous feed the line of projection will more closely approach the vertical thus placing the gritty material in advance of the wheel. The structure and mounting of the valve and trough provide means by which it is completely concealed and protected in the ordinary vehicle and adapt it for mounting in direct relation to a hopper contained within the rear fender.

While the specific construction of the several parts have been shown and described, the invention is not confined thereto as changes and alterations may be made without departing from the spirit of the invention as defined by the following claims.

Having thus described our invention, what we claim as new is:—

1. In a device of the class described, a hopper, a trough communicating therewith and having a substantially flat bottom extending to the delivery edge thereof to distribute the material in a thin layer therefrom, a cut-off valve secured to the trough beneath the hopper, operating means for retaining said valve in adjusted open position, and a spring secured to the hopper and engaging beneath the trough for automatically closing the valve and raising the trough when the operating means are released.

2. In a device of the class described, a hopper, a bearing plate communicating therewith, a cylindrical valve pivoted in said plate and having a cut away reduced portion at one side, a delivery trough having collars secured to said valve at opposite ends of said portion, and means for jointly operating said valve and trough.

3. In a device of the class described, a hopper, a bearing plate communicating therewith, a cylindrical valve pivoted in said plate and having a cut away reduced portion, a delivery trough secured to said valve, means for jointly operating said valve and trough, and a restoring spring surrounding said valve and having one end engaged with the trough and its opposite end with the bearing portion.

4. In a device of the class described, a fender provided with a hopper portion, a pivoting plate secured to a fixed part and having a receiving portion communicating with said fender, an oscillating valve mounted in said plate, a trough carried by said valve, and means for shifting said trough from an inclined position when open to a substantially horizontal position when closed.

5. In a device of the class described, a feed hopper, a valve controlling the delivery therefrom, and a trough communicating with said valve and provided with a plurality of channels disposed to direct delivery of material therefrom.

6. The combination with a vehicle having a running board and fender extending upward therefrom, of a cut-off valve and delivery trough pivotally mounted at the end of the running board to communicate with a hopper within the fender, said trough being disposed to lie beneath the running board when the valve is closed.

7. The combination with a vehicle having a running board and fender extending upward therefrom, of a cut-off valve and delivery trough pivotally mounted at the end of the running board to communicate with a hopper within the fender, said trough being disposed to swing from an inclined position when the valve is open to a substantially horizontal position beneath the running board when the valve is closed.

8. In a device of the class described, a fender comprising a curved body, an under plate secured thereto to form a hopper, an oscillating valve mounted at the discharge from said hopper, a trough carried by said valve for movement therewith, and a reservoir carried by the body of a vehicle and communicating with said hopper.

9. In a device of the class described, a hopper, a valve casing extending therefrom, an oscillating valve disposed in said casing, a crank shaft secured to said valve, a rock shaft having opposite arms, a link connecting one of said arms to said crank shaft, an operating rod extending from the other arm of the rock shaft, and a lever connected to said rod.

10. In a device of the class described, a hopper, a valve casing extending therefrom, an oscillating valve disposed in said casing, a crank shaft secured to said valve, a rock shaft having opposite arms, a link connecting one of said arms to said crank shaft, an operating rod extending from the other arm of the rock shaft, a lever connected to said rod, and latching means for securing said lever in adjusted position.

11. In a device of the class described, a hopper having a tubular valve casing, a cylindrical valve provided with a reduced discharge portion and bearing portions at its opposite ends, a trough provided with sleeves secured upon said valve, and means for operating said valve and trough.

12. In a device of the class described, a hopper having a tubular valve casing, a cylindrical valve provided with a reduced discharge portion and bearing portions at its opposite ends, a trough provided with sleeves secured upon said valve, a spout carried by the valve casing and discharging within said trough, and means for swinging said trough toward and from said spout.

13. In a device of the class described, a hopper having a tubular valve casing, a cylindrical valve provided with a reduced discharge portion and bearing portions at its opposite ends, a trough provided with sleeves secured upon said valve, a spout carried by the valve casing and discharging within said trough, and a tension spring mounted upon the valve and engaging beneath said trough to automatically actuate the same.

In testimony whereof we affix our signatures.

WILLIAM W. SMITH.
WILLIAM K. PORTER.